United States Patent
Wang et al.

(10) Patent No.: US 10,107,275 B2
(45) Date of Patent: Oct. 23, 2018

(54) LINEAR MOTOR AND COMPRESSOR HAVING THE SAME

(71) Applicant: Sheng-Lian Lin, Taoyuan (TW)

(72) Inventors: Chin-Chao Wang, Kaohsiung (TW); Yuh-Suiang Wang, Kaohsiung (TW)

(73) Assignee: Sheng-Lian Lin, Taoyuan (TW)

( * ) Notice: Subject to any disclaimer, the term of this patent is extended or adjusted under 35 U.S.C. 154(b) by 460 days.

(21) Appl. No.: 14/557,106

(22) Filed: Dec. 1, 2014

(65) Prior Publication Data
US 2016/0156235 A1    Jun. 2, 2016

(51) Int. Cl.
| | |
|---|---|
| F04B 35/00 | (2006.01) |
| F04B 17/03 | (2006.01) |
| H02K 1/34 | (2006.01) |
| F04B 39/12 | (2006.01) |
| F04B 5/02 | (2006.01) |
| H02K 41/025 | (2006.01) |
| H02K 41/03 | (2006.01) |
| F04B 35/04 | (2006.01) |
| H02K 33/16 | (2006.01) |

(52) U.S. Cl.
CPC .............. *F04B 17/03* (2013.01); *F04B 5/02* (2013.01); *F04B 35/045* (2013.01); *F04B 39/121* (2013.01); *H02K 1/34* (2013.01); *H02K 33/16* (2013.01); *H02K 41/025* (2013.01); *H02K 41/031* (2013.01)

(58) Field of Classification Search
CPC ........ F04B 35/04; F04B 35/045; F04B 17/03; F04B 5/02; H02K 41/02; H02K 41/031; H02K 41/025; H02K 33/16; H02K 33/00

USPC ...... 417/350, 417, 418; 310/166, 168, 12.25
See application file for complete search history.

(56) References Cited

U.S. PATENT DOCUMENTS

| | | | | |
|---|---|---|---|---|
| 2,865,559 | A * | 12/1958 | Gigler | F04B 35/045 417/363 |
| RE25,934 | E * | 12/1965 | Chausson | F04B 35/045 310/36 |
| 3,336,488 | A * | 8/1967 | Scott | H02K 33/06 310/24 |
| 3,931,554 | A * | 1/1976 | Spentzas | H02K 33/12 310/30 |

(Continued)

FOREIGN PATENT DOCUMENTS

| | | |
|---|---|---|
| JP | 2002138957 | 5/2002 |
| JP | 2004088884 | 3/2004 |
| JP | 2014036569 | 2/2014 |

OTHER PUBLICATIONS

Office Action dated Feb. 27, 2018 for corresponding Japanese Patent Application No. 2014-225051.

*Primary Examiner* — Kenneth J Hansen
*Assistant Examiner* — Christopher Bobish
(74) *Attorney, Agent, or Firm* — Chieh-Mei Wang

(57) ABSTRACT

A linear motor includes a housing, a mover and a stator unit. The mover is movable relative to the housing, and includes a rod member, a plurality of first magnetic poles mounted to the rod member, and a plurality of second magnetic poles mounted to the rod member. The first and second magnetic poles are arranged alternately in a circumferential direction of the rod member, and are partially overlapped circumferentially. The stator unit is disposed in the housing, surrounds the mover, and is able to be energized to drive reciprocal movement of the mover relative to the housing.

10 Claims, 9 Drawing Sheets

(56) References Cited

U.S. PATENT DOCUMENTS

| | | | | |
|---|---|---|---|---|
| 4,353,220 A * | 10/1982 | Curwen | H02K 33/02 | 417/214 |
| 4,395,649 A * | 7/1983 | Thome | H02K 33/02 | 310/15 |
| 4,607,197 A * | 8/1986 | Conrad | H02K 37/04 | 310/12.14 |
| 4,857,786 A * | 8/1989 | Nihei | H02K 1/17 | 310/12.17 |
| 4,868,431 A * | 9/1989 | Karita | H02K 41/03 | 310/12.19 |
| 5,104,298 A * | 4/1992 | Takahashi | F04B 17/042 | 310/17 |
| 5,701,039 A * | 12/1997 | Parison | H02K 41/03 | 310/12.25 |
| 6,087,742 A * | 7/2000 | Maestre | H02K 41/033 | 310/12.24 |
| 6,326,706 B1 * | 12/2001 | Zhang | F04B 35/045 | 310/12.24 |
| 6,382,935 B1 * | 5/2002 | Mikiya | F04B 45/047 | 417/413.1 |
| 6,512,318 B2 * | 1/2003 | Torok | H02K 1/246 | 310/181 |
| 6,663,361 B2 * | 12/2003 | Kohl | F04B 17/042 | 310/14 |
| 6,930,414 B2 * | 8/2005 | Qiu | H02K 35/06 | 310/12.25 |
| 7,665,510 B2 * | 2/2010 | Nara | F28F 13/10 | 165/104.28 |
| 7,687,954 B2 * | 3/2010 | Neet | H02K 19/24 | 310/263 |
| 8,770,951 B2 * | 7/2014 | Ishibashi | F04B 35/045 | 417/415 |
| 2011/0274571 A1 * | 11/2011 | Ishibashi | F04B 35/045 | 417/417 |
| 2014/0030116 A1 * | 1/2014 | Wallace | F04B 43/02 | 417/53 |
| 2014/0042832 A1 * | 2/2014 | Wang | H02K 33/12 | 310/12.21 |

\* cited by examiner

LINEAR MOTOR AND COMPRESSOR HAVING THE SAME

FIELD OF THE INVENTION

The invention relates to a motor, more particularly to a linear motor.

BACKGROUND OF THE INVENTION

Referring to FIGS. 1 and 2, a conventional linear motor 9 includes a housing 91, a mover 92, a first stator 93 and a second stator 94. The first and second stators 93, 94 are disposed fixedly in the housing 91, and are spaced apart from each other in a left-right direction. The mover 92 includes a rod 921 and a magnet 922. The rod 921 extends through the first and second stators 93, 94, and is movable relative to the housing 91 in the left-right direction. The magnet 922 is connected co-movably to the rod 921, is disposed in the housing 91, and is configured as a permanent magnet. In operation, the first and second stators 93, 94 are alternately energized to alternately attract the magnet 922, so as to drive the mover 92 to move reciprocally between a left position (see FIG. 1) and a right position (see FIG. 2).

When the mover 92 is driven by one of the first and second stators 93, 94 to move to a corresponding position, the magnet 922 is misaligned from the other one of the first and second stators 93, 94 in the left-right direction. Since the distance between the left and right positions is relatively long, the other one of the first and second stators 93, 94 needs to be energized to generate a large force to attract the magnet 922, and thus the conventional linear motor cannot operate smoothly.

SUMMARY OF THE INVENTION

Therefore, the object of the present invention is to provide a linear motor that can overcome the aforesaid drawbacks associated with the prior art.

Accordingly, a linear motor of the present invention includes a housing, a mover and a stator unit. The mover is movable relative to the housing along an axis, and has a portion that is disposed in the housing. The mover includes a rod member that extends along the axis, a plurality of first magnetic poles that are mounted to the rod member, and a plurality of second magnetic poles that are mounted to the rod member. Each of the first magnetic poles has an overlapping portion and an extending portion. Each of the second magnetic poles has an overlapping portion and an extending portion. The overlapping portions of the first magnetic poles and the overlapping portions of the second magnetic poles are arranged alternately in a circumferential direction of the rod member. The extending portions of the first magnetic poles extend respectively from the overlapping portions of the first magnetic poles in a first direction of the axis. The extending portions of the second magnetic poles extend respectively from the overlapping portions of the second magnetic poles in a second direction of the axis opposite to the first direction. The stator unit is disposed in the housing and surrounds the mover. The stator unit is able to be energized to drive reciprocal movement of the mover relative to the housing.

Another object of the present invention is to provide a compressor including a linear motor that can overcome the aforesaid drawbacks associated with the prior art.

Accordingly, a compressor of the present invention includes a linear motor and two cylinder units. The linear motor includes a housing, a mover and a stator unit. The mover is movable relative to the housing along an axis, and has a portion that is disposed in the housing. The mover includes a rod member that extends along the axis, a plurality of first magnetic poles that are mounted to the rod member, and a plurality of second magnetic poles that are mounted to the rod member. Each of the first magnetic poles has an overlapping portion and an extending portion. Each of the second magnetic poles has an overlapping portion and an extending portion. The overlapping portions of the first magnetic poles and the overlapping portions of the second magnetic poles are arranged alternately in a circumferential direction of the rod member. The extending portions of the first magnetic poles extend respectively from the overlapping portions of the first magnetic poles in a first direction of the axis. The extending portions of the second magnetic poles extend respectively from the overlapping portions of the second magnetic poles in a second direction of the axis opposite to the first direction. The stator unit is disposed in the housing and surrounds the mover. The stator unit is able to be energized to drive reciprocal movement of the mover relative to the housing. The cylinder units are disposed respectively at two opposite ends of the housing of the linear motor along the axis. Each of the cylinder units includes a piston. The pistons of the cylinder units are connected co-movably and respectively to two opposite ends of the rod member along the axis.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
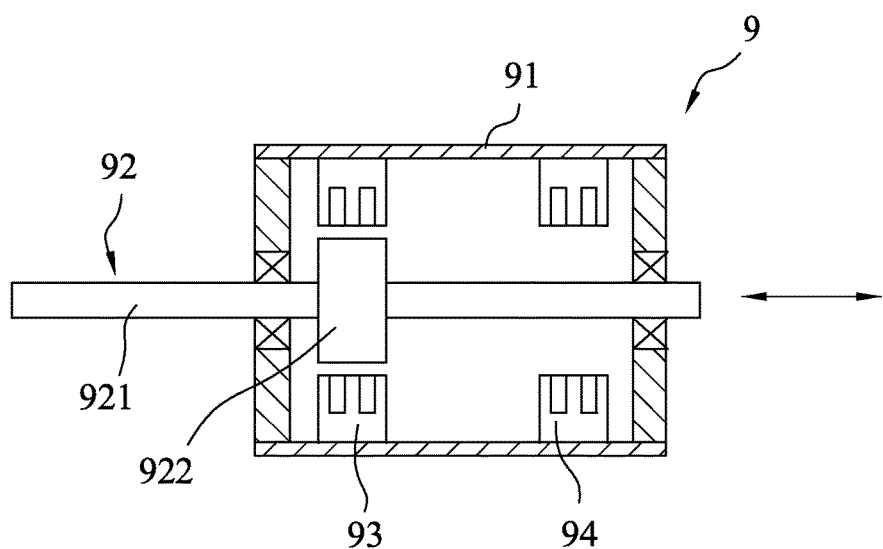
FIG. 1 is a sectional view of a conventional linear motor illustrating a mover at a left position.

Before the present invention is described in greater detail, it should be noted that like elements are denoted by the same reference numerals throughout the disclosure.

Figure 3:
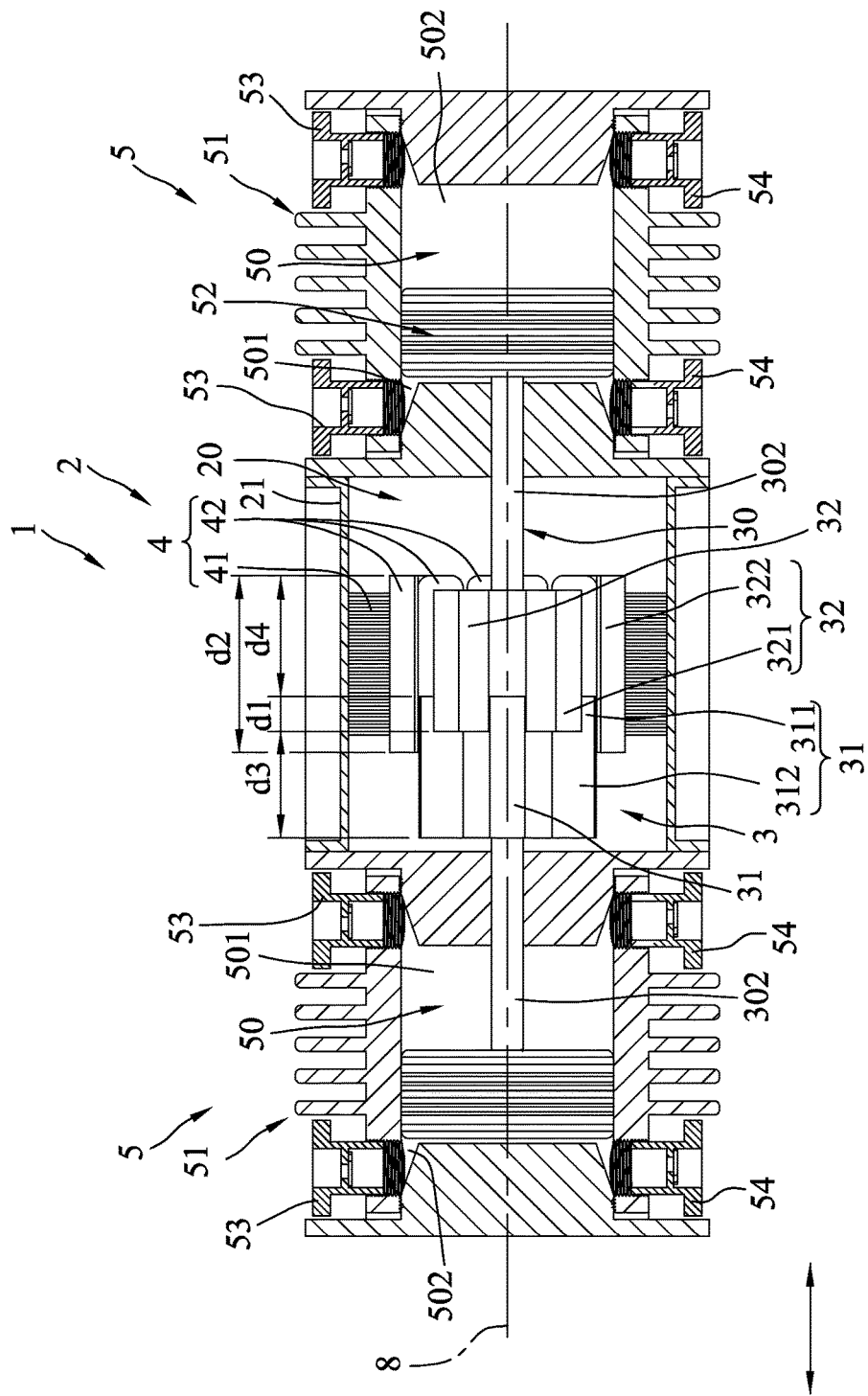
FIG. 3 is a partly sectional view of a compressor including a first embodiment of a linear motor according to the invention, illustrating a mover of the first embodiment at a second position.
Figure 4:
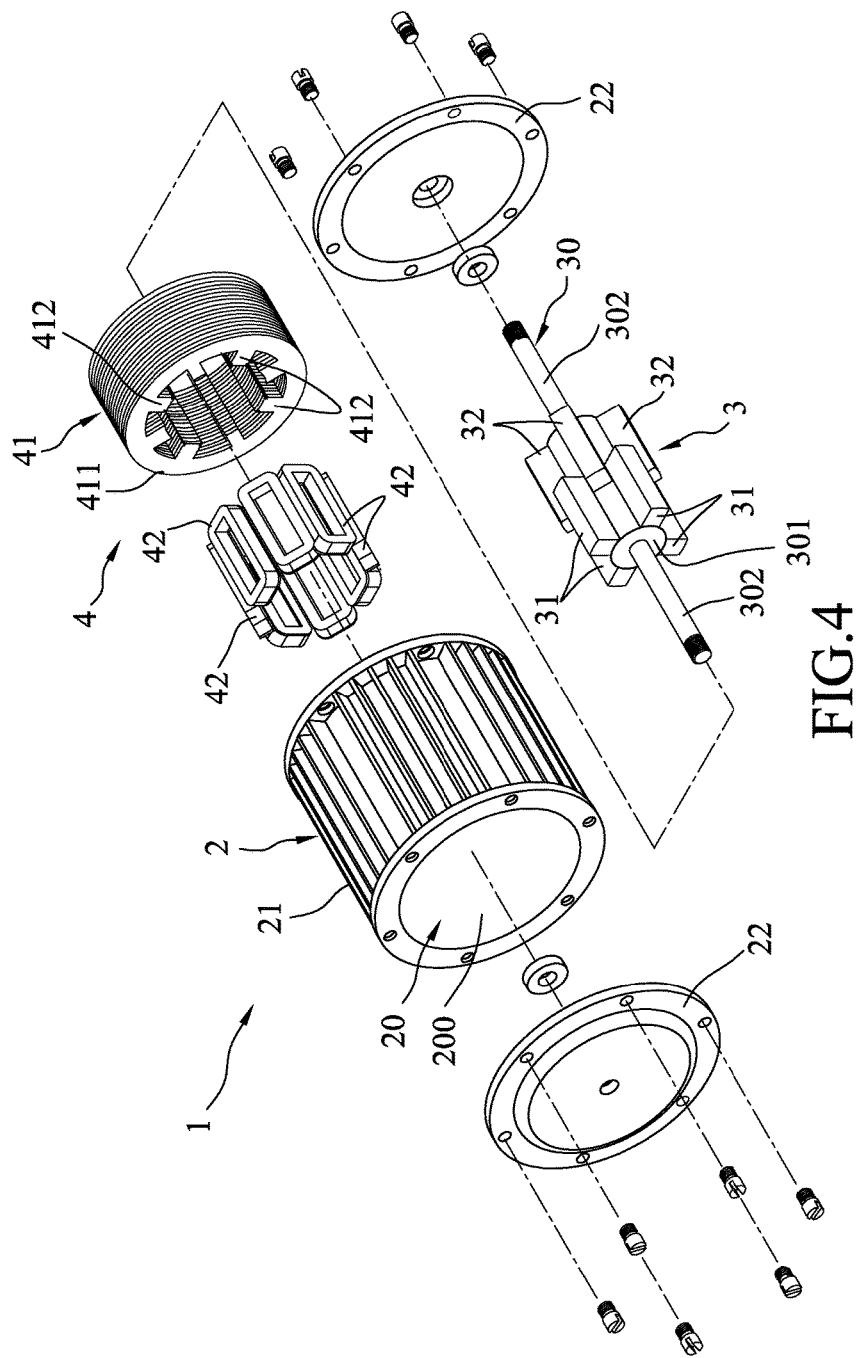
FIG. 4 is an exploded perspective view of the first embodiment.

Referring to FIGS. 3 and 4, a compressor is shown to include two cylinder units 5 and a first embodiment of a linear motor 1 according to the present invention.

The first embodiment includes a housing 2, a mover 3 and a stator unit 4.

The housing 2 includes a tubular body 21 that surrounds an axis 8, and two cap bodies 22 that respectively cover two opposite end of the tubular body 21 along the axis 8. The tubular body 21 and the cap bodies 22 cooperatively define a retaining space 20 thereamong.

The mover 3 includes a rod member 30, a plurality of first magnets 31 and a plurality of second magnets 32.

The rod member 30 extends along the axis 8, is movable relative to the housing 2 along the axis 8, and has a central portion 301 and two end portions 302. The central portion 301 is disposed in the retaining space 20. The end portions 302 extend respectively from two opposite ends of the central portion 301 along the axis 8, and extend respectively through the cap bodies 22.

In this embodiment, the first and second magnets are configured as permanent magnets. A radial distal end of each of the first magnets, a first magnetic pole 31, has a magnetic polarity opposite to that of a radial distal end of each of the second magnets 32, a second magnetic pole 32.

The first magnetic poles 31 are mounted co-movably to the central portion 301 of the rod member 30. Each of the first magnetic poles 31 has an overlapping portion 311 and an extending portion 312.

The second magnetic poles 32 are mounted co-movably to the central portion 301 of the rod member 30. Each of the second magnetic poles 32 has an overlapping portion 321 and an extending portion 322.

The overlapping portions 311 of the first magnetic poles 31 and the overlapping portions 321 of the second magnetic poles 32 are arranged alternately in a circumferential direction of the rod member 30. The extending portions 312 of the first magnetic poles 31 extend respectively from the overlapping portions 311 of the first magnetic poles 31 in a first direction of the axis 8. The extending portions 322 of the second magnetic poles 32 extend respectively from the overlapping portions 321 of the second magnetic poles 32 in a second direction of the axis 8 opposite to the first direction.

The stator unit 4 is disposed fixedly in the retaining space 20, and includes a stator seat 41 and a plurality of stators 42. The stator seat 41 is made of iron, silicon steel or other magneto-conductive materials, and includes an annular section 411 that surrounds the central portion 301 of the rod member 30, and a plurality of angularly spaced-apart mount sections 412 that extend radially and inwardly from an inner surrounding surface of the annular section 411. The stators 42 are mounted respectively to the mount sections 412 of the stator seat 41. In this embodiment, each of the stators 42 is configured as an electromagnetic coil.

In this embodiment, the overlapping portion 311 of each of the first magnetic poles 31 has a length (d1) along the axis 8 equal to that of the overlapping portion 321 of each of the second magnetic poles 32. Each of the stators 42 of the stator unit 4 has a length (d2) along the axis 8 greater than the length (d3) of the extending portion 312 of each of the first magnetic poles 31, greater than the length (d4) of the extending portion 322 of each of the second magnetic poles 32, and smaller than a sum of the length of each of the first magnetic poles 31 along the axis 8 and the length (d4) of the extending portion 322 of each of the second magnetic poles 32 along the axis 8 (i.e., d1+d3+d4).

The cylinder units 5 are disposed respectively at two opposite sides of the linear motor 1 along the axis 8. Each of the cylinder units 5 includes a cylinder body 51 that is connected fixedly to the housing 2 and that defines an inner space 50 therein, a piston 52 that is connected co-movably to a respective one of the end portions 302 of the rod member 30 and that is disposed in the inner space 50 to divide the inner space 50 into a first space portion 501 proximate to the linear motor 1 and a second space portion 502 distal from the linear motor 1, at least two intake valve units 53 each openable to communicate fluidly a respective one of the first space portion 501 and the second space portion 502 with external environment, and at least two exhaust valve units 54 each openable to communicate fluidly a respective one of the first space portion 501 and the second space portion 502 with the external environment.

Figure 5:
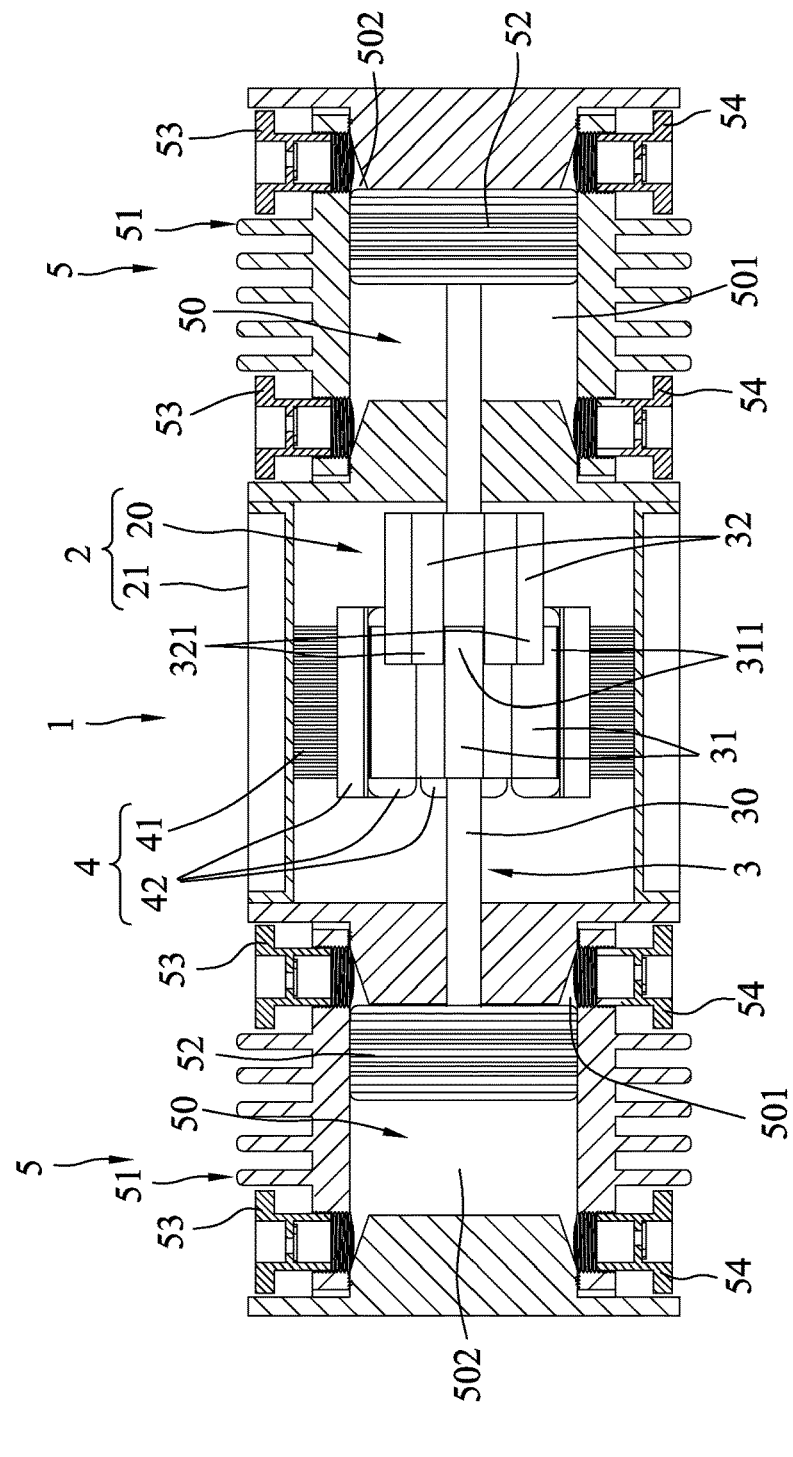
FIG. 5 is a partly sectional view similar to FIG. 3 but illustrating that the mover of the first embodiment is at a first position.

In operation, the stators 42 of the stator unit 4 are electrically energized to alternately generate opposite first and second electromagnetic fields. Referring to FIG. 5, when the stators 42 generates the first electromagnetic field, the first magnetic poles 31 are attracted by the stators 42 and the second magnetic poles 32 are repelled by the stators 42. Referring back to FIG. 3, when the stators 42 generates the second electromagnetic field, the first magnetic poles 31 are repelled by the stators 42 and the second magnetic poles 32 are attracted by the stators 42. As such, the stator unit 4 drives reciprocal movement of the mover 3 relative to the housing 2 between a first position (see FIG. 5) and a second position (see FIG. 3).

Along with the reciprocal movement of the mover 3, the first space portion 501 and the second space portion 502 of each of the cylinder units 5 are alternately compressed by the piston 52 the cylinder unit 5. For each of the first and second space portions 501, 502 of the cylinder units 5, the corresponding intake valve unit 53 is closed and the corresponding exhaust valve unit 54 is opened when it is compressed, and the corresponding intake valve unit 53 is opened and the corresponding exhaust valve unit 54 is closed when it expands.

Figure 2:
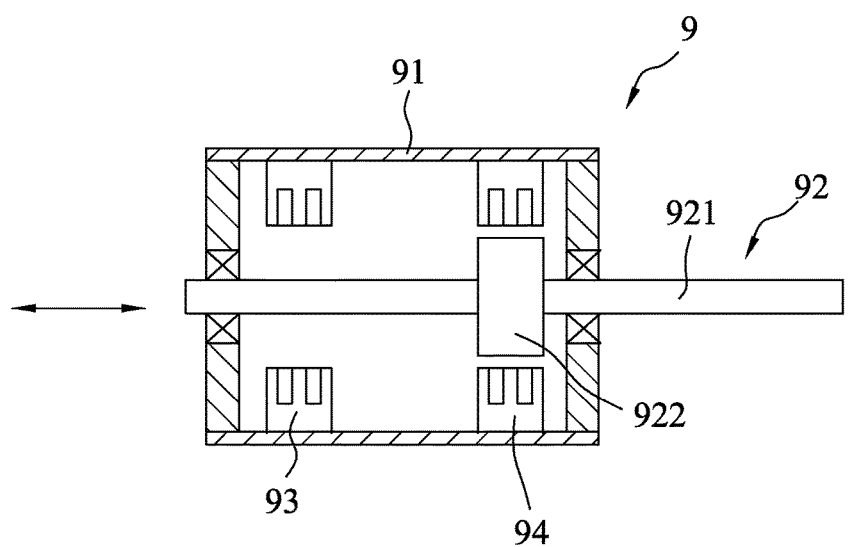
FIG. 2 is a sectional view similar to FIG. 1 but illustrating that the mover is at a right position.

It is notable that since the first and second magnetic poles 31, 32 are overlapped circumferentially, the overlapping portions 311, 321 of the first and second magnetic poles 31, 32 are surrounded by the stator unit 4 whether the mover 3 is at the first position or at the second position. When the stators 42 of the stator unit 4 is energized to generate a corresponding one of the first and second electromagnetic fields to move the mover 3 in a corresponding one of the first and second directions of the axis 8, the stators 42 can attract the corresponding ones of first or second magnetic poles 31, 32 easily because of the relatively small distance therebetween compared with the conventional linear motor 9 (see FIGS. 1 and 2). Simultaneously, since the radial distal end of each of the second magnets 32 has the magnetic polarity opposite to that of the radial distal end of each of the first magnetic poles 31, the stators 42 repel the other ones of the first or second magnetic poles 31, 32 to facilitate smooth reciprocal movement of the mover 3.

Moreover, by virtue of the configuration of the mover 3 of this embodiment, the dimension of the mover 3 along the axis 8 can be reduced. Therefore, dimension of the linear motor 1 along the axis 8 can be reduced as well.

In this embodiment, the mover 3 includes four first magnetic poles 31 and four magnetic poles 32, and the stator units includes eight stators 42 that correspond respectively in angular position to the first and second magnetic poles 31, 32. However, the configuration of the mover 3 and the stator unit 4 is not limited to such a structure as long as the stator unit 4 can be electrically energized to generate different electromagnetic fields to drive the reciprocal movement of the mover 3.

Figure 6:
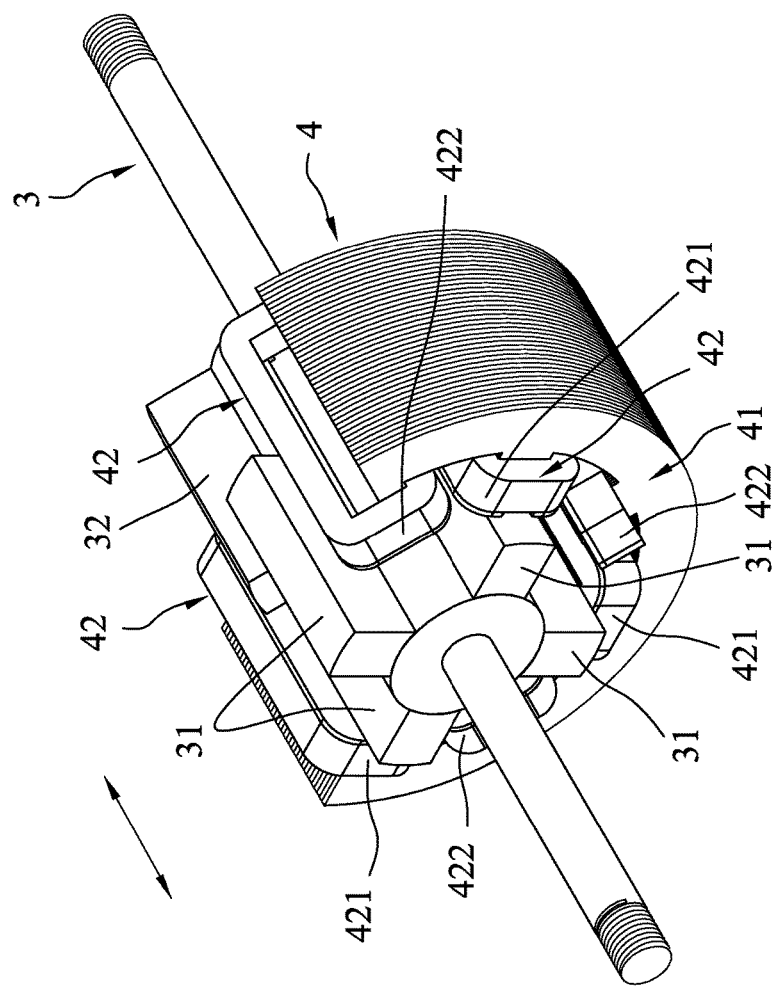
FIG. 6 is a cutaway perspective view of a stator and the mover of the first embodiment.
Figure 7:
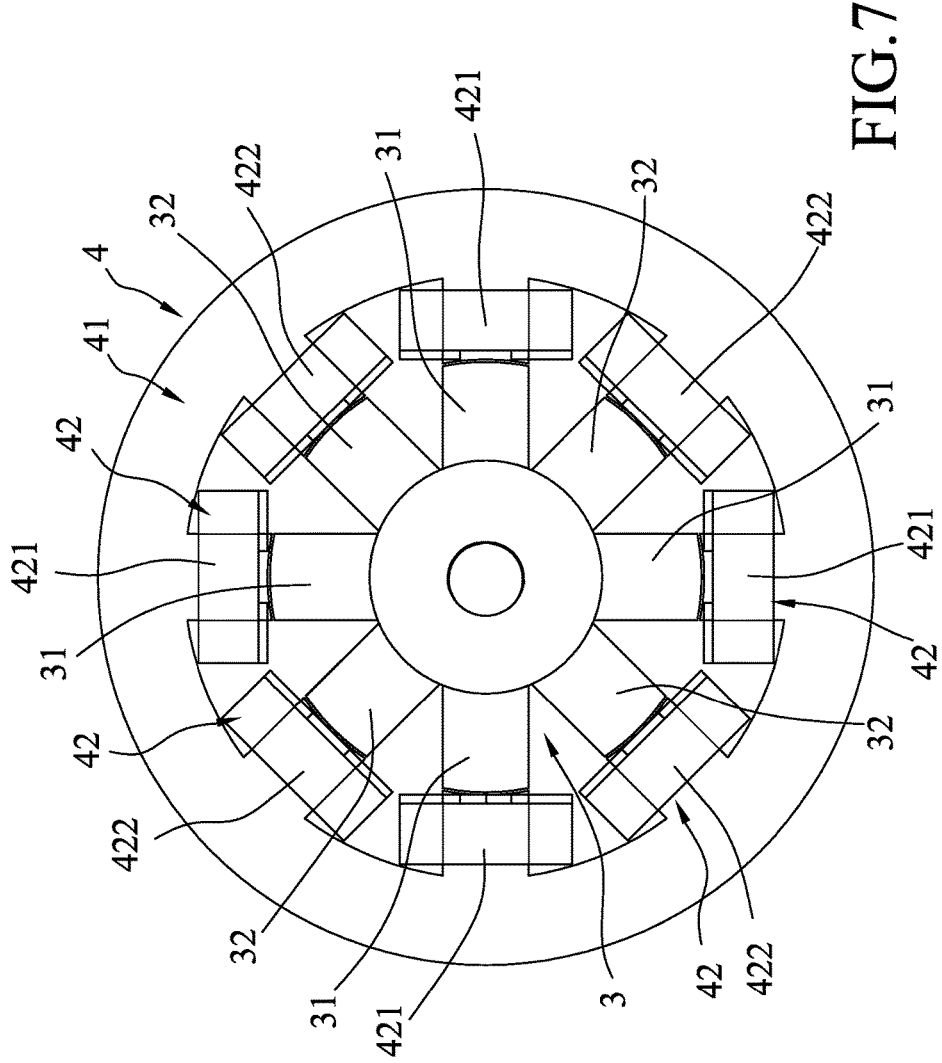
FIG. 7 is an end view of the stator and the mover of the first embodiment.

Referring to FIGS. 6 and 7, in a variation of the first embodiment, the stators 42 are divided into first stators 421 and second stators 422 that are alternately arranged in a circumferential direction of the stator seat 41. The first stators 421 correspond respectively in angular position to the first magnetic poles 31, and are able to be energized to attract or repel the first magnetic poles 31. The second stators 422 correspond respectively in angular position to the second magnetic poles 32, and are able to be energized to attract or repel the second magnetic poles 32.

When the linear motor 1 works under a first condition where the first and second stators 421, 422 are energized for attracting the first and second magnetic poles 31, 32, the first and second stators 421 are alternately and respectively energized to generate the first and second electromagnetic fields to alternately and respectively attract the first and second magnetic poles 31, 32, so as to drive the reciprocal movement of the mover 3.

On the contrary, when the linear motor 1 works under a second condition where the first and second stators 421, 422 are energized for repelling the first and second magnetic poles 31, 32, the first and second stators 421 are alternately and respectively energized to generate the second and first electromagnetic fields to alternately and respectively repel the first and second magnetic poles 31, 32, so as to drive the reciprocal movement of the mover 3.

In another variation of this embodiment, the first and second magnetic poles 31, 32 may be configured as temporary magnets that are made of silicon steel, or be configured as movers that are made of magneto-conductive materials and that are typically used in a magnetic reluctance motor. The stators 42 in this variation are divided into first stators 421 and second stators 422 as well.

In operation, the first and second stators 421 are alternately and respectively energized to generate the first and second electromagnetic fields to alternately and respectively magnetize and attract the first and second magnetic poles 31, 32, so as to drive the reciprocal movement of the mover 3.

Figure 8:
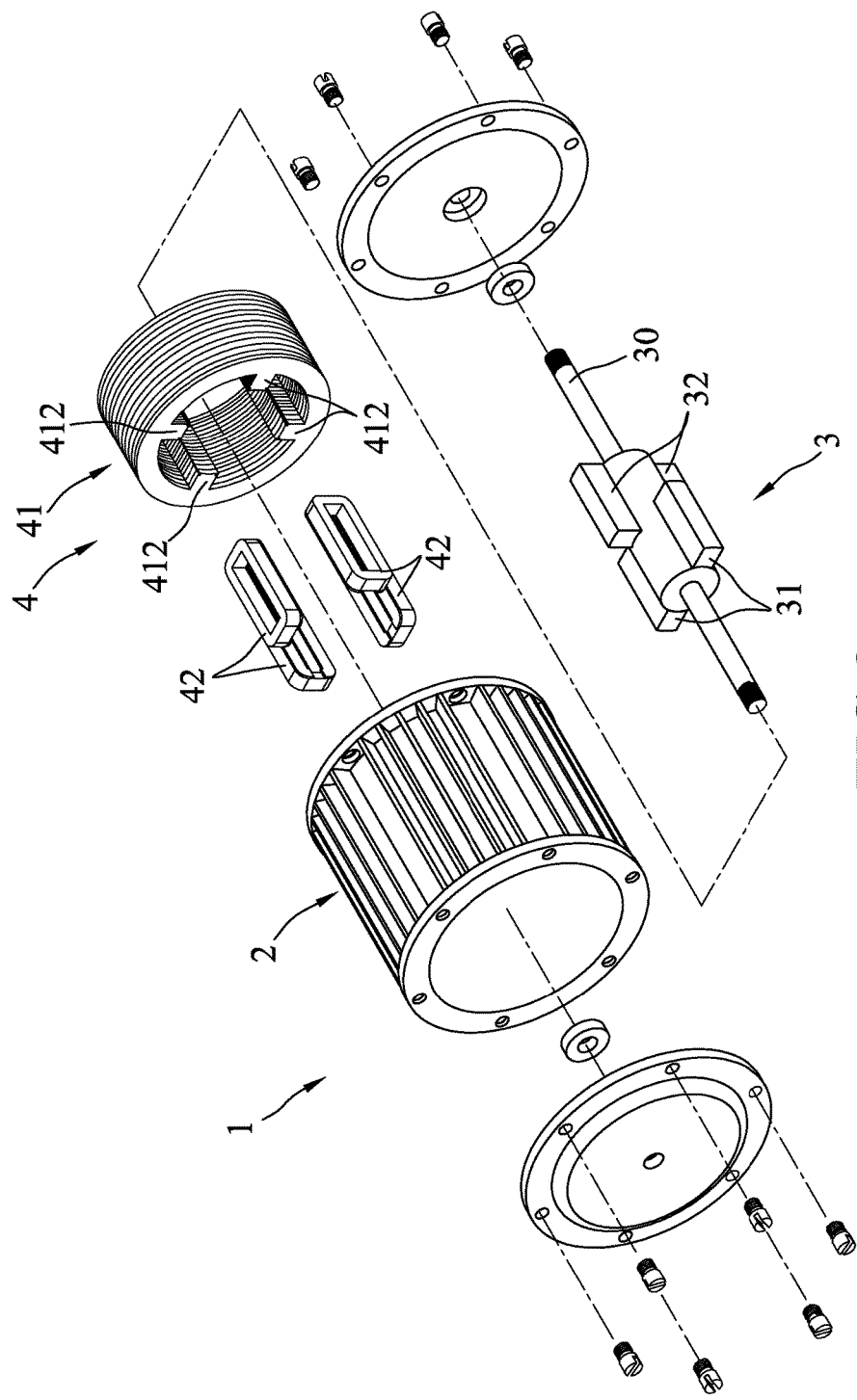
FIG. 8 is an exploded perspective view of a second embodiment of the linear motor according to the invention.

Referring to FIG. 8, a second embodiment of the linear motor 1 according to this invention is similar to the first embodiment. The differences are that the mover 3 of the second embodiment includes two first magnetic poles 31 and two second magnetic poles 32, the stator unit 4 includes four stators 42, and the stator seat 41 of the stator unit 4 has four mount sections 412 for being mounted respectively with the stators 42.

Figure 9:
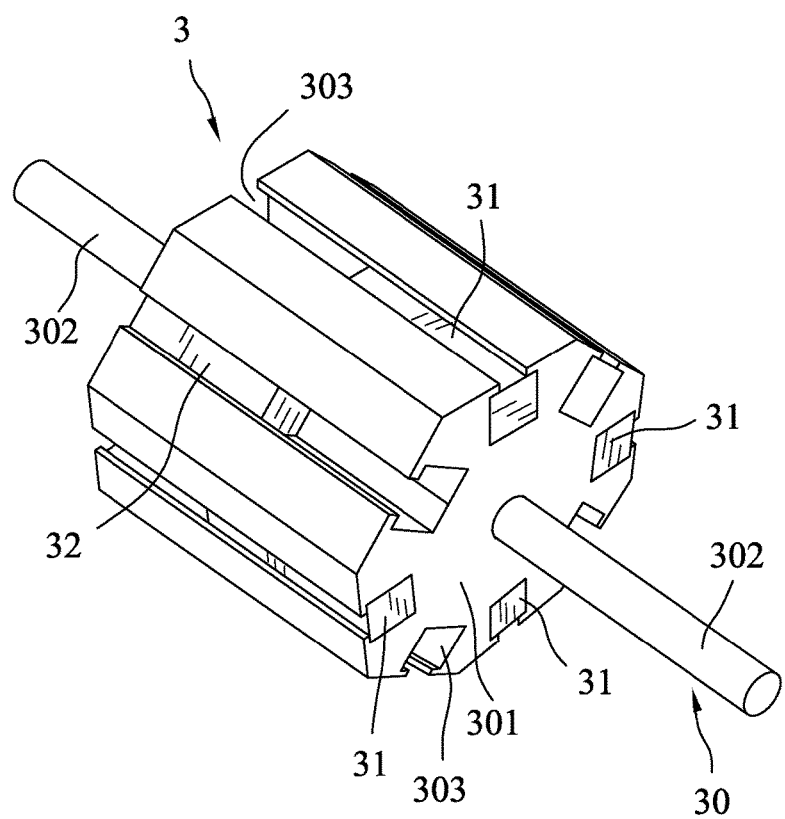
FIG. 9 is a perspective view of a mover of a third embodiment of the linear motor according to the invention.

FIG. 9 illustrates the mover 3 of a third embodiment of the linear motor 1 according to this invention. The central portion 301 of the rod member 30 is formed with a plurality of angularly spaced-apart mount grooves 303 that extend along a longitudinal direction of the rod member 30. The first and second magnetic poles 31, 32 are mounted respectively in the mount grooves 303.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A linear motor, comprising:
 a housing;
 a mover, comprising:
  a rod member, movable relative to the housing in longitudinal directions along an axis, wherein the rod member extends along the axis and comprises a central portion that is disposed in the housing;
  a plurality of first magnetic poles, mounted to the central portion, wherein the first magnetic poles are circumferentially disposed on the central portion and are spaced apart from one another, the first magnetic poles continuously abut against the central portion, each of the first magnetic poles has a same first polarity at a first radial distal end along the axis, the first radial distal end is substantially parallel to the axis, and the first magnetic poles are continuously extended in a first axial direction from a first edge of the central portion toward and without reaching a second edge of the central portion; and
  a plurality of second magnetic poles, mounted to the central portion, wherein the second magnetic poles are circumferentially disposed on the central portion and are arranged apart from the first magnetic poles, the second magnetic poles are disposed alternately with the first magnetic poles, the second magnetic poles continuously abut against the central portion, each of the second magnetic poles has a same second polarity opposite to the first polarity at a second radial distal end along the axis, the second radial distal end is substantially parallel to the axis, and the second magnetic poles are continuously extended in a second axial direction, opposite to the first axial direction, from the second edge of the central portion, toward and without reaching the first edge of the central portion, and over extended ends of the first magnetic poles; and
 a stator unit, disposed in the housing and surrounding the mover, the stator unit being able to be energized to drive the mover to move reciprocally relative to the housing in longitudinal directions along the axis, wherein a length of the stator unit along the axis is less than a distance between the first edge and the second edge of the central portion, the length of the stator unit along the axis is greater than a distance between the first edge of the central portion and extended ends of the second magnetic poles, and the length of the stator unit along the axis is greater than a distance between the second edge of the central portion and the extended ends of the first magnetic poles.

2. The linear motor as claimed in claim 1, wherein said stator unit includes
 a stator seat having an annular section that surrounds said rod member, and a plurality of angularly spaced-apart mount sections that extend radially and inwardly from an inner surrounding surface of said annular section, and
 a plurality of stators mounted respectively to said mount sections.

3. The linear motor as claimed in claim 1, wherein said rod member has two end portions that extend respectively from two opposite ends of said central portion away from each other along the axis.

4. The linear motor as claimed in claim 1, wherein said first magnetic poles and said second magnetic poles are configured as permanent magnets.

5. The linear motor as claimed in claim 1, wherein said first magnetic poles and said second magnetic poles are configured as temporary magnets.

6. A compressor, comprising:
 a linear motor, including:
  a housing;
  a mover, comprising:
   a rod member, movable relative to the housing in longitudinal directions along an axis, wherein the rod member extends along the axis and comprises a central portion that is disposed in the housing:

a plurality of first magnetic poles, mounted to the central portion, wherein the first magnetic poles are circumferentially disposed on the central portion and are spaced apart from one another, the first magnetic poles continuously abut against the central portion, each of the first magnetic poles has a same first polarity at a first radial distal end along the axis, the first radial distal end is substantially parallel to the axis, and the first magnetic poles are continuously extended in a first axial direction from a first edge of the central portion toward and without reaching a second edge of the central portion; and a plurality of second magnetic poles, mounted to the central portion, wherein the second magnetic poles are circumferentially disposed on the central portion and are arranged apart from the first magnetic poles, the second magnetic poles are disposed alternately with the first magnetic poles, the second magnetic poles continuously abut against the central portion, each of the second magnetic poles has a same second polarity opposite to the first polarity at a second radial distal end along the axis, the second radial distal end is substantially parallel to the axis, and the second magnetic poles are continuously extended in a second axial direction, opposite to the first axial direction, from the second edge of the central portion, toward and without reaching the first edge of the central portion, and over extended ends of the first magnetic poles; and a stator unit, disposed in the housing and surrounding the mover, the stator unit being able to be energized to drive the mover to move reciprocally relative to the housing in longitudinal directions along the axis, wherein a length of the stator unit along the axis is less than a distance between the first edge and the second edge of the central portion, the length of the stator unit along the axis is greater than a distance between the first edge of the central portion and extended ends of the second magnetic poles, and the length of the stator unit along the axis is greater than a distance between the second edge of the central portion and the extended ends of the first magnetic poles; and two cylinder units, disposed respectively at two opposite ends of the housing of the linear motor along the axis, wherein each of the cylinder units includes a piston, the pistons of the cylinder units are connected co-movably and respectively to two opposite ends of the rod member along the axis.

7. The compressor as aimed in claim 6, wherein said stator unit includes a stator seat having an annular section that surrounds said rod member, and a plurality of angularly spaced-apart mount sections that extend radially and inwardly from an inner surrounding surface of said annular section, and a plurality of stators mounted respectively to said mount sections.

8. The compressor as claimed in claim 6, wherein said rod member has two end portions that extend respectively from two opposite ends of said central portion away from each other along the axis.

9. The compressor as claimed in claim 6, wherein said first magnetic poles and said second magnetic poles are configured as permanent magnets.

10. The compressor as claimed in claim 6, wherein said first magnetic poles and said second magnetic poles are configured as temporary magnets.

* * * * *